UNITED STATES PATENT OFFICE.

LUDWIG KERN, OF HAMBURG, GERMANY.

METHOD FOR PRODUCING MANURE.

1,145,370. Specification of Letters Patent. Patented July 6, 1915.

No Drawing. Application filed April 16, 1914. Serial No. 832,338.

*To all whom it may concern:*

Be it known that I, LUDWIG KERN, a subject of the King of Bavaria, residing at Hamburg 22, Germany, have invented certain new and useful Improvements in Methods for Producing Manure, of which the following is a specification.

As is well known, numerous useful plants more particularly culmiferous plants (cereals) necessarily require for their cultivation silicic acid. For this reason, when it is desired to cultivate such plants in ground or soil poor in silicic acid such as moor it is necessary to make use of a manure which supplies silicic acid to the plants in an assimilable shape. Sand or gravel is not suitable for this purpose, because it sinks too quick in the moorish or marshy soil on account of its high specific weight and besides the silicic acid contained therein is opened out by the influences of weather and the soil too slow to bring it into a shape assimilable for the plants.

It has been proposed heretofore to make use of water glass either potash-water glass or soda water glass or a mixture of both. The silicic acid therein is in a soluble shape, however the solubility again is too great in comparison to sand, so that it will easily happen, that the plants are over fed with silicic acid, unless the water glass is completely washed away by heavy rains in which case it is not used up by the plants at all. Moreover it must be admitted that water glass being generally used in a liquid state is very unfit for manure purposes and the price is much too high for making use of it in manuring on a great scale.

The object of the present invention is to provide for a method of producing a manure which has a moderate or small specific weight and in which the silicic acid has a medium solubility suitable for normal conditions and therefore is void of the disadvantages of the known manures. Moreover the new manure may contain any amount of potash, by which the fertilizing property is highly increased Unpurified silicious marl or kieselguhr, which is not suitable for being used in the known kieselguhr industry serves as starting product. Kieselguhr of the description is found for instance in the layers of Virginia and Maryland to a thickness of 50 feet and more particularly in the neighborhood of Richmond. This material contains in its average composition besides other ingredients 70% silicic acid, 5% iron oxid and 4% alkali. According to the present invention this material is mixed with a solution of potassic salt, for instance, sulfate of potassium, carbonate of potassium and so on, and the mixture is calcined in a suitable apparatus at a temperature of 100–200° C., whereby the ingredients act chemically one on the other. Eventually lime, phosphate powder or the like is added in order to adapt the manure to the particular conditions of the soil. In this way a manure is produced which is adapted to be spread or powdered about and consists of a mixture of a very soluble silicate of potassium with colloidal silicic acid easily assimilable by the plants and improves physically the soil on account of its loose state, allowing water and air to easily enter.

I claim:

1. A method for producing a manure, consisting in mixing kieselguhr with a solution of a potassic salt and in calcining the mixture.

2. A method for producing a manure, consisting in mixing kieselguhr with a solution of a potassic salt and in calcining the mixture, at a temperature from 100–200° C.

3. A method for producing a manure, consisting in mixing raw kieselguhr, consisting on an average of 70% of silicic acid, 5% of iron oxid and 4% of alkali with a solution of a potassic salt and in calcining the mixture.

4. A method for producing a manure, consisting in mixing kieselguhr with a solution of a potassic salt and in calcining the mixture, finally adding lime and phosphate powder.

5. A method for producing a manure, consisting in mixing raw kieselguhr, consisting on an average of 70% of silicic acid, 5% of iron oxid and 4% of alkali with a solution of a potassic salt and in calcining the mixture, finally adding lime and phosphate powder.

LUDWIG KERN.

Witnesses:
 MAX F. A. KAEMPFF,
 ERNEST H. L. MUMMENHOFF.

Copies of this patent may be obtained for five cents each, by addressing the "Commissioner of Patents, Washington, D. C."